United States Patent [19]

Keritsis

[11] Patent Number: 4,890,963

[45] Date of Patent: Jan. 2, 1990

[54] CUTTING FLUID TRANSPORTING DEVICE AND CUTTING TOOLS EMPLOYING THE SAME

[75] Inventor: George Keritsis, Knoxville, Tenn.

[73] Assignee: Carboloy Inc., Warren, Mich.

[21] Appl. No.: 209,539

[22] Filed: Jun. 21, 1988

[51] Int. Cl.⁴ .................. B23B 27/10; F16L 27/08
[52] U.S. Cl. .................................. 408/59; 285/190; 409/136
[58] Field of Search ................ 285/190; 408/56, 57, 408/59; 409/135, 136; 279/20

[56] References Cited

U.S. PATENT DOCUMENTS 4,293,251  10/1981  Anderson ........................ 285/190
4,625,707  12/1986  Whittaker ........................ 408/57

FOREIGN PATENT DOCUMENTS 819417  9/1959  United Kingdom ............... 279/20

Primary Examiner—Daniel Howell
Attorney, Agent, or Firm—Hedman, Gibson, Costigan & Hoare

[57] ABSTRACT

A collar adapted to be engaged about a rotating cutting tool for continuously transporting a cutting fluid from a stationary source to the cutting tool including outer and inner rings in sealed relationship forming a cutting fluid channel and at least one low friction material containing channel and a pair of tenon keys positioned in curvilinear grooves on the surface of the inner ring to provide a sealed passageway for the flow of the cutting fluid from the collar to the cutting tool, and cutting tools employing the same.

34 Claims, 3 Drawing Sheets

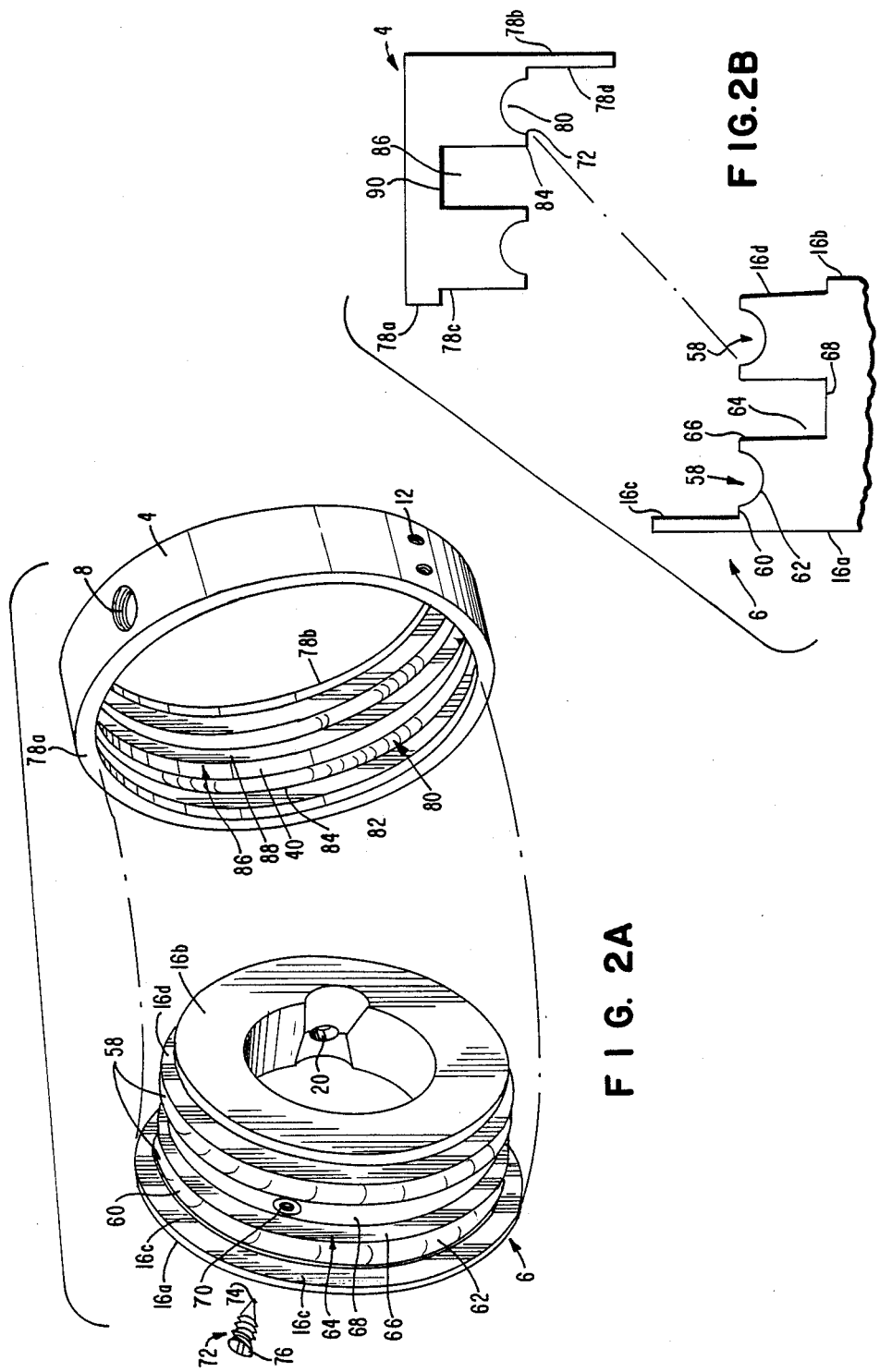

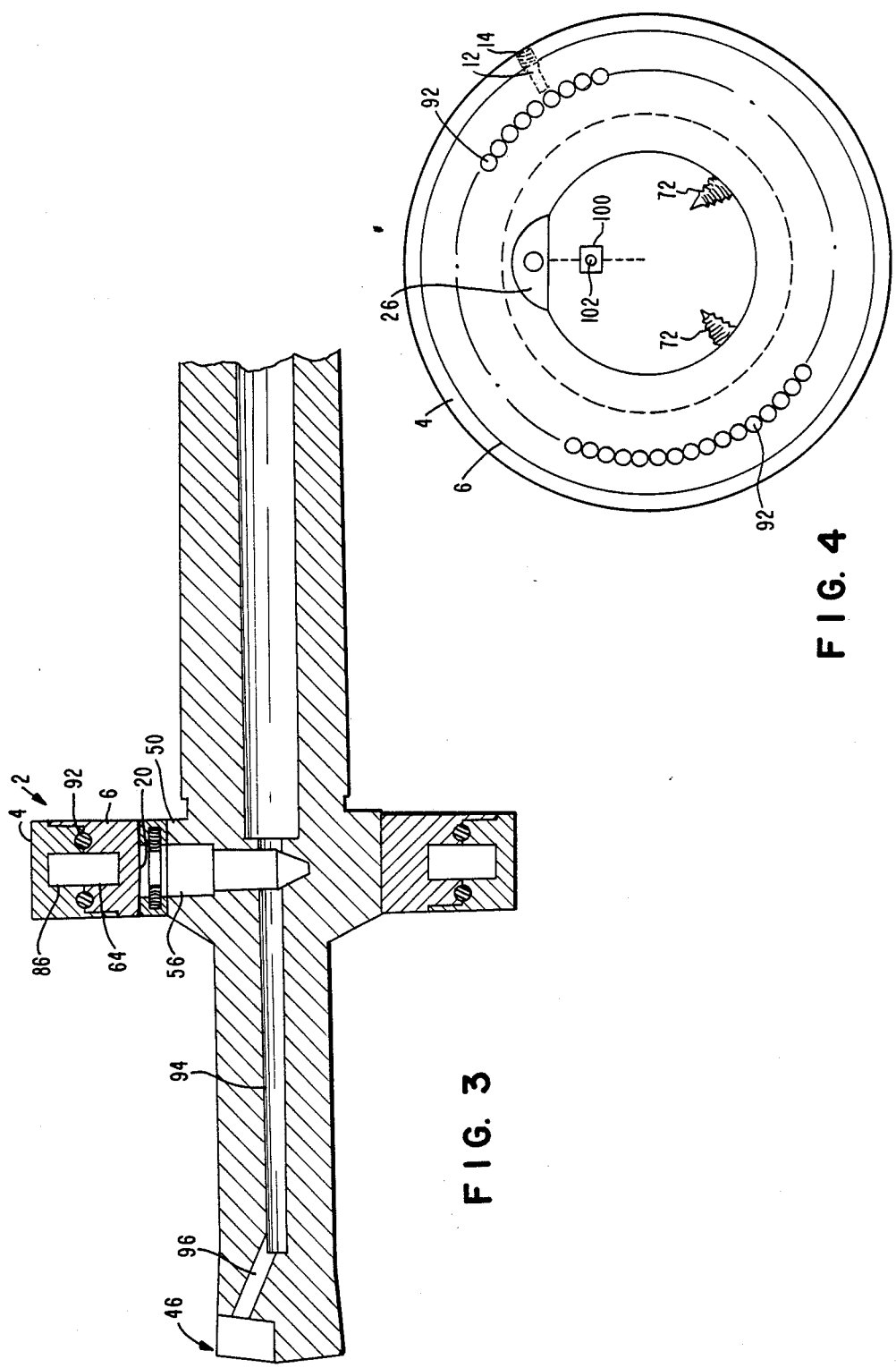

CUTTING FLUID TRANSPORTING DEVICE AND CUTTING TOOLS EMPLOYING THE SAME

FIELD OF THE INVENTION

The present invention is directed to a device for transporting a cutting fluid such as a coolant from a stationary source into and through a rotating cutting tool and ejecting the same in proximity to the junction of the cutting insert and workpiece and to cutting tools employing the same.

BACKGROUND OF THE INVENTION

Cutting fluids such as lubricants and coolants have long been employed for lubricating and cooling cutting inserts and workpieces and to aide in the ejection of chips. At first, devices for dispensing cutting fluids were mounted externally to the cutting tool itself. Such devices proved to be cumbersome and inhibited upward ejection of chips due to a downward flow of the cutting fluid onto the cutting region.

More recently, rotatable cutting tools have been provided with internal cutting fluid systems. These systems typically include a sleeve which is placed about a "circular section" of the tool body. The rounded circular section has a cross-bore for conveying the fluid from the sleeve to the inside of the tool body.

The sleeve containing the cross-bore is rotatably mounted over the circular section. The cross-bore in the sleeve is alignable with the cross-bore in the circular section to provide a passageway for the flow of the cutting fluid into the tool body which enters the sleeve from a stationary source. When the cross-bore of the circular section is contiguous with the cross-bore in the sleeve cutting fluid flows into the tool body and forward through an axial channel and out an ejection port in proximity to the cutting insert.

This design which is typical of existing internal cutting fluid systems has at least three significant disadvantages which render it of limited use in commercial machining operations. First, the flow of cutting fluid into the circular section is intermittent in that cutting fluid is able to flow into the tool body only when the respective cross-bores are aligned which occurs once for each revolution of the tool body. This results in a reduction of the potential pressure of the cutting fluid that exits the ejection port and thus is of limited value in aiding in the removal of chips formed at the junction of the cutting insert and workpiece.

The second disadvantage of the aforementioned system is that a crescent-shaped gap exists between the flat surface of the circular section and the contiguous round inner surface of the sleeve. This gap allows some cutting fluid to avoid passing into the central bore of the flange thereby reducing the pressure of the cutting fluid exiting at the cutting insert.

A third disadvantage is that the coolant collar must be mounted on a specified circular area to accommodate the width of the collar (e.g. 2") which increases the overall length of the tool. This is especially disadvantageous when length: diameter ratios are critical to performance.

It is therefore an object of the present invention to provide an internal cutting fluid system which enables a continuous flow of fluid from a stationary source to the cutting insert of a rotatable cutting tool.

It is another object of the invention to provide a collar which has a slender profile and has the same width as a thin flange to minimize the length to diameter ratio to improve the rigidity of the cutting tool.

It is a further object of the invention to provide a collar which can be mounted about a flange section of a rotatable cutting tool in which there is full and flat face to face contact between the flange section and the collar to thereby enable the continuous flow of fluid therethrough without loss of pressure.

It is still a further object of the invention to provide a rotatable cutting tool incorporating the collar of the invention to provide a cutting tool having an internal, continuous flow cutting fluid system.

It is another object of the invention to provide a cutting tool in which the flange is integral with the tool body to provide greater strength in the region of maximum stress.

SUMMARY OF THE INVENTION

The present invention is directed to an internal cutting fluid system which includes a collar adapted to be engaged about a rotating cutting tool for transporting a cutting fluid from a stationary source through the cutting tool and out an ejection port in the region of the cutting insert and workpiece.

The collar includes an outer ring which includes means for receiving the cutting fluid from the stationary source. By way of example, the outer ring can be provided with a hole which is fitted with a tube which opens at one end into the hole with the other end connected to the cutting fluid source.

There is also provided an inner ring having a cutting tool contacting face and containing means for transporting the cutting fluid to the cutting tool. The inner ring is adapted to be inserted within the outer ring in sealed engagement. The sealed inner and outer rings thereby form a first channel through which the cutting fluid is able to flow from the receiving means of the outer ring to the transport means of the inner ring.

The sealed rings also define at least one second channel which includes means for enabling the inner ring to rotate within the outer ring in concert with the rotation of the cutting tool while the outer ring remains stationary.

The collar also includes sealing means which is positioned between the cutting tool contacting face of the inner ring and the cutting fluid receiving means of the cutting tool. The sealing means provides flat face to face pressure contact between the inner ring of the collar and the cutting tool to thereby provide a sealed passageway for the flow of the cutting fluid circulating within the first channel to the cutting tool and prevents rotational slip between the inner ring and the cutting tool.

In a preferred embodiment of the invention there is also provided locking means which is secured to the inner ring and in operation is adapted to exert additional pressure contact on the cutting tool in the direction of the sealing means to thereby secure the collar about the body.

The cutting tool contacting surface of the inner ring preferably comprises a central passage bore which is in flow communication with the first channel and a pair of symmetrical curvilinear grooves tapered outwardly toward the side surfaces of the inner ring and surrounding the central bore. In conjunction therewith, the sealing means is preferably a pair of tenon keys having a generally crescent shape and an axial hole therethrough which are inserted-into the curvilinear grooves and secured to each other by screw means such as a differential screw inserted into the respective axial holes.

The tenon keys have a flat surface which is adapted to engage a corresponding flat surface of the cutting tool wherein the central passage bore of the inner ring is in sealed flow communication with a corresponding bore of the cutting tool.

The second channel formed by the sealed inner and outer rings preferably comprises means for providing a low friction surface therebetween to facilitate rotation of the inner ring within the outer ring. In a preferred form of the invention, the low friction surface means comprises ball bearings which may be coated with a lubricant.

The rotatable cutting tool of the invention, in addition to the collar previously described includes a substantially cylindrical tool body having at least one cutting insert assembly and corresponding cutting fluid ejection ports at one end and an opposed end adapted to be inserted into the rotatable cutting machine such as a lathe or milling machine.

Circumscribing a portion of the tool body and, preferably, integral therewith is a flange section having a substantially circular major surface terminating in a substantially flat minor surface which has a central passage bore therein extending to the center of the tool body. The flat minor surface is in face-to-face contact with the flat surface of the tenon keys when the collar is secured in the operable position about the flange section of the tool body. In a preferred form of the invention, the flange section is formed integral with the tool body for maximum strength.

The portion of the tool body extending from the flange section to the ejection port is provided with a central fluid passageway to enable the cutting fluid entering the bore in the flange section to move forward internally of the tool body. Divergent pathways are provided between the central passageway and the ejection ports to provide for directional flow of the cutting fluid onto the cutting insert.

BRIEF DESCRIPTION OF THE DRAWINGS

The following drawings in which like reference characters indicate like parts are illustrative of preferred embodiments of the invention and are not intended to limit the scope of the invention as encompassed by the claims forming part of the application.

FIG. 2A is a plan view of the inner and outer rings forming the collar of the present invention;

FIG. 2B is a partial cross-sectional view of the collar shown in FIG. 2A;

FIG. 3 is a cross-sectional view of a rotatable cutting tool having the collar of the present invention mounted thereon; and FIG. 4 is a side view of the collar showing the relative location of ball bearings providing a low friction surface for facilitating rotation of the inner ring within the outer ring.

DETAILED DESCRIPTION OF THE INVENTION

Figure 1:
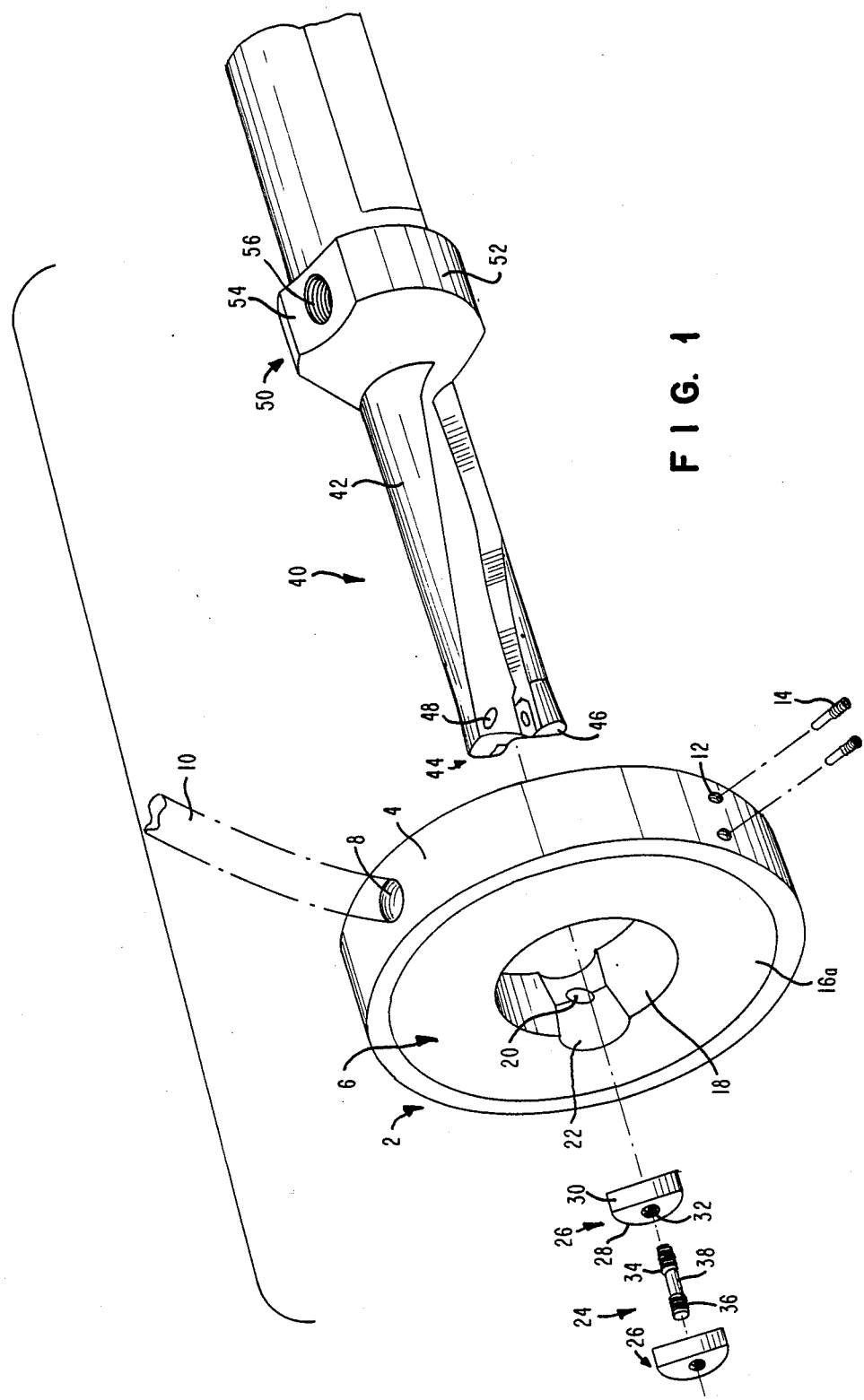
FIG. 1 is an exploded elevational view showing an embodiment of the collar of the present invention and the manner in which it is mounted about a rotatable cutting tool.

Referring to the drawings and particularly to FIG. 1, the collar 2 of the present invention includes an outer ring 4 and an inner ring 6 in sealed relationship wherein the inner ring 6 is rotatable within the outer ring 4. The outer ring 4 is provided with a hole 8 in which is secured a tubular fitting 10 or similar device connected to a source of cutting fluid (not shown). The cutting fluid therefore is initially accessed to the collar 2 by passage from the source through the tubular fitting 10 and into the hole 8.

The outer ring 4 is also provided with a pair of access holes 12 for insertion into the collar 2 of a low friction material as described hereinafter. Once the low friction material is added to the collar 2, the holes are sealed by inserting screws 14 therein.

The exterior of inner ring 6 is provided with opposed side surfaces 16a and 16b (see FIGS. 2A and 2B) and inside surface 18. The side surfaces 16a and 16b have corresponding inner sealing surfaces 16c and 16d which are adapted to engage corresponding sealing surfaces of the outer ring 4. The inside surface 18 is provided with a passage bore 20 and a pair of curvilinear grooves 22 adjacent the bore 20. The passage bore 20 provides a passageway for the flow of the cutting fluid from the interior of the collar 2 to the cutting tool.

The grooves 22 serve as a seat for a sealing means 24 which provides a seal around the bore 20 to enable the cutting fluid to flow from the bore 20 to the cutting tool without leakage.

The sealing means 24 comprises a pair of tenon keys 26 having a substantially crescent-shaped rear surface 28, a substantially flat front surface 30, and an axial hole 32 therethrough. The tenon keys 26 are secured in spaced apart relationship to each other by a differential screw 34 having opposed threads 36 and a centrally disposed non-threaded portion 38. The length of the non-threaded portion 38 approximately corresponds to the diameter of the bore 20.

If desired, the differential screw 34 may be inserted into a supporting jacket 100 as best seen in FIG. 4. The jacket 100 is partially insertable into the bore 20 and has an axial hole 102 for receiving the differential screw 34. Use of the jacket 100 enables the tenon key 26 to remain in position about the bore 20 if the cutting tool 40 is removed from the collar 2.

The rotatable cutting tool 40 shown in FIG. 1 generally includes a cylindrical tool body 42 having one end 44 containing at least one cutting insert assembly 46 and corresponding ejection ports 48 through which the cutting fluid is ejected onto the cutting insert assembly 46.

Circumscribing a portion of the tool body 42 is a flange section 50, preferably formed integral with the tool body 42 and having a major circular surface 52 terminating in a minor flat surface 54. Passing through the flat surface 54 and into the center of the tool body is a passageway receiving bore 56 which is alignable with the bore 20 of the inner ring 6 when the collar 2 is secured about the flange section 50.

Referring to FIGS. 2A and 2B, the inner ring 6 and the outer ring 4 when secured together in sealed relationship form a cutting fluid channel and at least one additional channel containing a low friction material which facilitates rotation of the inner ring 6 within the outer ring 4.

More specifically, the side surface 16a of the inner ring 6 has a larger diameter than the opposed side surface 16b. Between the side surfaces 16a and 16b are two channel portions 58 for housing a low friction material. The channel portions 58 are formed by side wall portions 60 and a bottom surface 62. The preferred low friction material is ball bearings (shown in FIG. 4) having a shape corresponding to the shape of the channel 58. When ball bearings are employed, the bottom surface 62 is contoured in conjunction with the side wall portions 60 to the channel portion 58 which is suitable for housing the ball bearings.

It is preferred that a sufficient number of ball bearings are loaded into the channel portions 58 so as to form a continuous assembly of ball bearings through the channel portions 58 to maximize the low friction effect. In addition, a lubricant or coating may be added to the channel 58 portions to further reduce friction after the inner ring 6 and outer ring 4 are sealed. The size of the ball bearings and the corresponding size of the channel portions 58 may vary so long as the ball bearings are free to move within the channel portions 58 when the inner ring 6 is rotated within the outer ring 4. It should be also understood that one or more channels 58 may be used within the spirit of the invention although two channels 58 as shown in FIG. 2 is a preferred design.

Disposed between the channel portions 58 of the inner ring 6 is a cutting fluid channel portion 64 comprised of substantially vertical side wall portions 66 and a flat base 68. In accordance with the invention, the side wall portions 66 and the base 68 may be contoured as described above for the channel portions 58 so long as the cutting fluid channel portion 64 has a cross-sectional area sufficient to enable the desired amount of the cutting fluid to circulate therein and exit the bore 20 of the inner ring 6.

The base 68 of the cutting fluid channel portion 64 has therein at least one threaded hole 70 (two are shown in FIG. 2) for insertion therein of a screw means 72 of sufficient length to pass through the hole 70. The screw means 72 includes an end 74 which is adapted to contact and exert pressure on the circular surface 52 of the flange section 50 of the cutting tool 40. The end 74 may be flat or have a shape complimentary to the shape of the circular surfaces 52 (i.e., concave shape), or preferably may be pointed so as to enable the screw means 72 to bite into the circular surface 52 of the flange section 50.

The screw means 72 also has a head portion 76 which is adapted to form a sealed fit in the hole 70 to ensure that the cutting fluid will not leak through the hole 70. Preferably, the head 76 forms a flat surface with the base 68 when the screw means 72 is in sealed relationship within the hole 70 to prevent obstruction of the flow of the cutting fluid in the channel portion 64.

The outer ring 4 shown best in FIGS. 2A and 2B, has side surface 78a and 78b and corresponding sealing surfaces 78c and 78d which are adapted to form a sealed fit with the corresponding sealing surface 16c and 16d of the inner ring 6 when the inner ring 6 is secured within the outer ring 4. Accordingly, the side surface 78b has an internal diameter sufficiently smaller than the side surface 78a so that when the inner ring 6 and the outer ring 4 are sealed, the diameter of the collar 2 is uniform over its entire circumference as shown in FIG. 1.

The outer ring 4 has an interior surface complimentary to the exterior surface of the inner ring 6 so that the profile defines a completely formed cutting fluid channel and low friction material containing channels. In addition, seals (e.g. seals made of TEFLON; TEFLON is a registered trademark of DuPont for a product made of polytetrafluoroethylene) may be placed between the sealing surface 16c and 78c and 16d and 78d to insure against leakage of the cutting fluid.

The inner surface of the outer ring 4 includes a pair of complimentary low friction material channel portions 80 comprising side wall portions 82 and a ceiling 84. Similarly, there is provided a cutting fluid channel portion 86 including side wall portions 88 and a ceiling 90. When the inner ring 6 is inserted into the outer ring 4, the respective low friction material containing channel portions 58 and 80 and the respective cutting fluid channel portions 64 and 86 are precisely aligned to form the desired enclosed passageways.

The inner ring 6 is inserted into the outer ring 4 with or without the seals to form a completely assembled and sealed collar 2. Ball bearings 92 or other suitable low friction material is inserted through the holes 12 into the channels formed by the respective channel portions 58 and 80. When loading is completed, the holes 12 are sealed by inserting therein the screws 14 thereby forming a self-contained bearing type collar.

The engagement and operation of the collar 2 about the rotatable cutting tool 40 is described with reference to the drawings and particularly by reference to FIGS. 2-4.

The tenon keys 26 already threaded on to the respective ends of the differential screw 34 are inserted into the curvilinear grooves 22. The invention assembly is placed over the flange section 50 of the cutting tool 40. The bore 20 of the inner ring 6 is aligned with the bore 56 of the flange section 50.

The screws 72 within the channel portions 64 are then rotated until the screw ends 74 contact and exert pressure on the circular surface 52 thereby driving and locking the flange section 50 in the direction of the bore 20 and the tenon keys 26. Minor adjustments to the position of the tenon keys 26 within the grooves 22 is then made by rotating the differential screw 34 with a suitable tool thereby sealing with face-to-face contact the crescent-shaped gap and assuring appropriate cutting fluid pressure.

The tube 10 is then connected to the source of the cutting fluid and is secured within the hole 8 of the outer ring 4 in a conventional manner.

When the cutting tool 40 is turned on it rotates in concert with the inner ring 6 while the outer ring 4 remains stationary. The cutting fluid from the source enters the collar 2 through the tube 10 and circulates within the cutting fluid channel formed by channel portions 64 and 86. The fluid exits the bore 20 in the inner ring 6 into the bore 56 of the flange section 50. The cutting fluid then enters a longitudinal bore 94 in the tool body 42 and flows through a substantial length of the tool body 42 where it is directed to the respective ejection ports 48 via associated transverse bores 96.

In accordance with the present invention, the cutting fluid encounters little or no loss of pressure during its flow from the source to the ejection port 48 and therefore provides a fully pressurized stream of fluid for cutting insert and workpiece lubrication and/or cooling and for assistance in the ejection and removal of chips.

What I claim is:

1. A collar adapted to be engaged about a rotating cutting tool for transporting a cutting fluid from a stationary source to the rotating cutting tool comprising:
   (a) an outer ring comprising means for receiving the cutting fluid from the stationary source;
   (b) an inner ring having a cutting tool contacting surface and means for transporting the cutting fluid to the cutting tool, said inner ring adapted to be inserted within the outer ring in sealed engagement, wherein the sealed outer and inner rings form a first channel for passage of the cutting fluid from the cutting fluid receiving means of the outer ring to the transport means of the inner ring and at least one second channel comprising means for enabling the inner ring to rotate within the outer ring in concert with the rotation of the cutting tool while the outer ring remains stationary;

(c) sealing means positioned between the cutting tool contacting surface of the inner ring and the cutting fluid receiving means of the cutting tool and adapted to provide flat face to face pressure contact between the inner ring and the cutting tool to thereby provide a sealed passageway for the flow of the cutting fluid from the first channel to the cutting tool and to prevent rotational slip between the inner ring and the cutting tool; and (d) locking means secured to the inner ring and adapted to exert additional pressure contact on the cutting tool in the direction of the sealing means to thereby secure the collar about the cutting tool.

2. The collar of claim 1, wherein the cutting tool contacting surface of the inner ring comprises a central bore in flow communication with the first channel and a pair of curvilinear grooves tapered outwardly from the side surfaces of the inner ring and surrounding the central bore, said sealing means comprising a pair of tenon keys adapted to be removably inserted into said grooves, said tenon keys having a flat cutting tool contacting face adapted to provide face to face contact with the cutting tool.

3. The collar of claim 2, wherein the tenon keys have an axial hole therethrough and are secured in spaced-apart relationship to each other within the curvilinear grooves by screw means inserted into said respective axial holes.

4. The collar of claim 1, wherein the locking means comprises at least one hole through the bottom surface of the inner ring and substantially opposed to the cutting tool contacting face and screw means insertable through said hole and having a cutting tool contacting end for exerting pressure against the cutting tool in the direction of the cutting tool contacting face of the inner ring.

5. The collar of claim 1, wherein the locking means comprises two holes spaced about 90° from each other and screw means insertable through each of said holes.

6. The collar of claim 1, wherein the at least one second channel comprises means for providing a low friction surface between the sealed inner and outer rings to facilitate rotation of the inner ring within the outer ring.

7. The collar of claim 6, wherein the low friction surface means comprises a plurality of ball bearings within the at least one second channel.

8. The collar of claim 6 comprising a pair of second channels spaced apart from each other by the first channel containing the cutting fluid.

9. A rotatable cutting tool having internal means for transporting a cutting fluid from a stationary source to a cutting insert comprising:

(a) a substantially cylindrical tool body having a first end comprising at least one cutting insert and at least one corresponding cutting fluid ejection port and an opposed end insertable into a rotatable cutting machine;

(b) a flange section circumscribing a portion of the tool body comprising a substantially circular major surface terminating in a substantially flat minor surface, said minor surface having therein a central bore extending through the flange section into the tool body;

(c) a cutting fluid passageway extending from the central bore of the flange section to the cutting fluid ejection port of the tool body;

(d) a collar adapted to be engaged about the flange section, said collar comprising, (1) an outer ring comprising means for receiving the cutting fluid from the stationary source, (2) an inner ring having a face adapted to engage the flat surface of the flange section and means for transporting the cutting fluid to the central bore of the flange section, said inner ring adapted to be inserted within the outer ring in sealed engagement, wherein the sealed outer and inner ring form a first channel for passage of the cutting fluid from the cutting fluid receiving means of the outer ring to the transport means of the inner ring and at least one second channel comprising means for enabling the inner ring to rotate within the outer ring in concert with the rotation of the tool body while the outer ring remains stationary, (3) sealing means positioned between the flange engaging face of the inner ring and the flat face of the flange section and adapted to provide flat face to face pressure contact between the inner ring and the flange section to thereby provide a sealed passageway for the flow of the cutting fluid from the first channel to the central bore of the flange section and to prevent rotational slip between the inner ring and the flange section; and (4) locking means secured to the inner ring and adapted to exert additional pressure on the flange section in the direction of the sealing means to thereby secure the collar about the flange section.

10. The rotatable cutting tool of claim 9, wherein the flange contacting face of the inner ring comprises a central bore in flow communication with the first channel and a pair of curvilinear grooves tapered outwardly from the side surfaces of the inner ring and surrounding the central bore, said sealing means comprising a pair of tenon keys adapted to be removably inserted into the grooves about the central bore, said tenon keys having a flat flange contacting face adapted to provide face to face pressure contact with the flat surface of the flange section to thereby seal and lock the inner ring to the cutting tool and thus prevent leakage of the cutting fluid and rotational slipping.

11. The rotatable cutting tool of claim 10 wherein the tenon keys have an axial hole therethrough and are secured to each other within the curvilinear grooves by screw means inserted into said respective axial holes.

12. The rotatable cutting tool of claim 9, wherein the locking means comprises at least one hole through the bottom surface of the inner ring and substantially opposed to the flange engaging face and screw means insertable through the hole and having a flange section contacting end for exerting pressure against the flange section in the direction of the flange section engaging face of the inner ring.

13. The rotatable cutting tool of claim 9, wherein the locking means comprises two holes spaced about 90° from each other and screw means insertable through each of said holes.

14. The rotatable cutting tool of claim 9, wherein the at least one second channel comprises means for providing a low friction surface between the sealed inner and outer rings to facilitate rotation of the inner ring within the outer ring.

15. The rotatable cutting tool of claim 14 wherein the low friction surface means comprises a plurality of ball bearings within the at least one second channel.

16. The rotatable cutting tool of claim 14 comprising a pair of second channels spaced apart from each other by the first channel containing the cutting fluid.

17. The rotatable cutting tool of claim 9, wherein the flange section is integral with the tool body.

18. A collar adapted to be engaged about a rotating cutting tool for transporting a cutting fluid from a stationary source to the rotating cutting tool comprising:
  (a) an outer ring comprising means for receiving the cutting fluid from the stationary source;
  (b) an inner ring having a cutting tool contacting surface and means for transporting the cutting fluid to the cutting tool, said cutting tool contacting surface of the inner ring comprising a central bore in flow communication with a first channel and a pair of curvilinear grooves tapered outwardly from the side surfaces of the inner ring and surrounding the central bore, said inner ring adapted to be inserted within the outer ring in sealed engagement, wherein the sealed outer and inner rings form said first channel for passage of the cutting fluid from the cutting fluid receiving means of the outer ring to the transport means of the inner ring and at least one second channel comprising means for enabling the inner ring to rotate within the outer ring in concert with the rotation of the cutting tool while the outer ring remains stationary; and
  (c) sealing means comprising a pair of tenon keys adapted to be removably inserted into said grooves, said tenon keys having a flat cutting tool contacting face adapted to provide face to face pressure contact with the cutting tool, said sealing means being positioned between the cutting tool contacting surface of the inner ring and a cutting fluid receiving means of the cutting tool to thereby provide a sealed passageway for the flow of the cutting fluid from the first channel to the cutting tool and to prevent rotational slip between the inner ring and the cutting tool.

19. The collar of claim 18 further comprising locking means secured to the inner ring and adapted to exert additional pressure contact on the cutting tool in the direction of the sealing means to thereby secure the collar about the cutting tool.

20. The collar of claim 18, wherein the tenon keys have an axial hole therethrough and are secured in spaced-apart relationship to each other within the curvilinear grooves by screw means inserted into said respective axial holes.

21. The collar of claim 19, wherein the locking means comprises at least one hole through the bottom surface of the inner ring and substantially opposed to the cutting tool contacting face and screw means insertable through said hole and having a cutting tool contacting end for exerting pressure against the cutting tool in the direction of the cutting tool contacting face of the inner ring.

22. The collar of claim 19, wherein the locking means comprises two holes spaced about 90° from each other and screw means insertable through each of said holes.

23. The collar of claim 18, wherein the at least one second channel comprises means for providing a low friction surface between the sealed inner and outer rings to facilitate rotation of the inner ring within the outer ring.

24. The collar of claim 23 wherein the low friction surface means comprises a plurality of ball bearings within the at least one second channel.

25. The collar of claim 23 comprising a pair of second channels spaced apart from each other by the first channel containing the cutting fluid.

26. A rotatable cutting tool having internal means for transporting a cutting fluid from a stationary source to a cutting insert comprising:
  (a) a substantially cylindrical tool body having a first end comprising at least one cutting insert and at least one corresponding cutting fluid ejection port and an opposed end insertable into a rotatable cutting machine;
  (b) a flange section circumscribing a portion of the tool body comprising a substantially circular major surface terminating in a substantially flat minor surface, said minor surface having therein a central bore extending through the flange section into the tool body;
  (c) a cutting fluid passageway extending from the central bore of the flange section to the cutting fluid ejection port of the tool body;
  (d) a collar adapted to be engaged about the flange section, said collar comprising,
    (1) an outer ring comprising means for receiving the cutting fluid from the stationary source,
    (2) an inner ring having a face adapted to engage the flat surface of the flange section and means for transporting the cutting fluid to the central bore of the flange section, said flange contacting face of the inner ring comprising a central bore in flow communication with a first channel and a pair of curvilinear grooves tapered outwardly from the side surface of the inner ring and surrounding the central bore, said inner ring adapted to be inserted within the outer ring in sealed engagement, wherein the sealed outer and inner rings form said first channel for passage of the cutting fluid from the cutting fluid receiving means of the outer ring to the transport means of the inner ring and at least one second channel comprising means for enabling the inner ring to rotate within the outer ring in concert with the rotation of the tool body while the outer ring remains stationary, and
    (3) sealing means comprising a pair of tenon keys adapted to be removably inserted into said grooves about the central bore, said tenon keys having a flat flange contacting face adapted to be in pressure contact with the flat face of the flange section, said engaging face of the inner ring and the flat face of the flange section to thereby provide a sealed passageway for the flow of the cutting fluid from the first channel to the central bore of the flange section and to prevent rotational slip between the inner ring and the flange section.

27. The cutting tool of claim 26 wherein the collar further comprises locking means secured to the inner ring and adapted to exert additional pressure on the flange section in the direction of the sealing means to thereby secure the collar about the flange section.

28. The rotatable cutting tool of claim 26 wherein the tenon keys have an axial hole therethrough and are secured to each other within the curvilinear grooves by screw means inserted into said respective axial holes.

29. The rotatable cutting tool of claim 27, wherein the locking means comprises at least one hole through the bottom surface of the inner ring and substantially opposed to the flange engaging face and screw means insertable through the hole and having a flange section contacting end for exerting pressure against the flange section in the direction of the flange section engaging face of the inner ring.

30. The rotatable cutting tool of claim 27, wherein the locking means comprises two holes spaced about 90° from each other and screw means insertable through each of said holes.

31. The rotatable cutting tool of claim 26 wherein the at least one second channel comprises means for providing a low friction surface between the sealed inner and outer rings to facilitate rotation of the inner ring within the outer ring.

32. The rotatable cutting tool of claim 31 wherein the low friction surface means comprises a plurality of ball bearings within the least one second channel.

33. The rotatable cutting tool of claim 31 comprising a pair of second channels spaced apart from each other by the first channel containing the cutting fluid.

34. The rotatable tool of claim 26, wherein the flange section is integral with the tool body.

* * * * *